US008630251B2

(12) United States Patent
Kwak et al.

(10) Patent No.: US 8,630,251 B2
(45) Date of Patent: Jan. 14, 2014

(54) METHOD OF SUPPORTING HETEROGENEOUS MODE IN A WIRELESS COMMUNICATION SYSTEM

(75) Inventors: Jin Sam Kwak, Anyang-si (KR); Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR); Bin Chul Ihm, Anyang-si (KR); Yong Ho Kim, Anyang-si (KR); Ae Ran Youn, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 973 days.

(21) Appl. No.: 12/531,012

(22) PCT Filed: Mar. 13, 2008

(86) PCT No.: PCT/KR2008/001422
§ 371 (c)(1),
(2), (4) Date: Sep. 11, 2009

(87) PCT Pub. No.: WO2008/111807
PCT Pub. Date: Sep. 18, 2008

(65) Prior Publication Data
US 2010/0046464 A1 Feb. 25, 2010

(30) Foreign Application Priority Data
Jun. 29, 2007 (KR) .................... 10-2007-0065764

(51) Int. Cl.
*H04W 4/00* (2009.01)
*H04J 1/00* (2006.01)

(52) U.S. Cl.
USPC .......................... 370/330; 370/343

(58) Field of Classification Search
USPC ............................................ 370/330
See application file for complete search history.

(56) References Cited

U.S. PATENT DOCUMENTS

| | | | |
|---|---|---|---|
| 7,551,546 B2* | 6/2009 | Ma et al. | 370/208 |
| 7,751,364 B2* | 7/2010 | Won et al. | 370/329 |
| 8,018,969 B2* | 9/2011 | Shim et al. | 370/476 |
| 8,155,062 B2* | 4/2012 | Jung et al. | 370/329 |
| 2004/0001429 A1* | 1/2004 | Ma et al. | 370/210 |
| 2005/0181822 A1* | 8/2005 | Sasaki et al. | 455/552.1 |
| 2006/0007849 A1* | 1/2006 | Kim et al. | 370/208 |
| 2006/0092875 A1* | 5/2006 | Yang et al. | 370/329 |
| 2006/0135072 A1 | 6/2006 | Kasher et al. | |
| 2007/0115816 A1* | 5/2007 | Sinivaara | 370/230 |
| 2007/0160017 A1* | 7/2007 | Meier et al. | 370/338 |
| 2007/0223419 A1* | 9/2007 | Ji et al. | 370/329 |

(Continued)

FOREIGN PATENT DOCUMENTS

EP 1 534 039 A2 5/2005

*Primary Examiner* — Guang Li
(74) *Attorney, Agent, or Firm* — Birch, Stewart, Kolasch & Birch, LLP

(57) ABSTRACT

A data communication method is disclosed, which can simultaneously support heterogeneous systems in a wireless communication system based on multiple carrier multiple access. For a dual mode between heterogeneous systems, the data communication method includes transmitting control information for a first system mode and a second system mode to a mobile station through a channel resource zone used in the first system mode, and performing data transmission and reception between the system and the mobile station through channel resource zones allocated from the first system mode or the second system mode.

7 Claims, 20 Drawing Sheets

(56) References Cited

U.S. PATENT DOCUMENTS

| | | | |
|---|---|---|---|
| 2007/0253367 A1* | 11/2007 | Dang et al. | 370/329 |
| 2007/0280292 A1* | 12/2007 | Lee et al. | 370/468 |
| 2008/0144612 A1* | 6/2008 | Honkasalo et al. | 370/370 |
| 2008/0167075 A1* | 7/2008 | Kurtz et al. | 455/561 |
| 2008/0186885 A1* | 8/2008 | Athalye et al. | 370/310 |
| 2008/0186939 A1* | 8/2008 | Kim et al. | 370/343 |

* cited by examiner

METHOD OF SUPPORTING HETEROGENEOUS MODE IN A WIRELESS COMMUNICATION SYSTEM

This application is the National Phase of PCT/KR2008/001422 filed on Mar. 13, 2008, which claims priority under 35 U.S.C. 119(e) to U.S. Provisional Application No. 60/894,869 filed on Mar. 14, 2007 and under 35 U.S.C. 119(a) to Patent Application No. 10-2007-0065764 filed in Korea on Jun. 29, 2007, all of which are hereby expressly incorporated by reference into the present application.

TECHNICAL FIELD

The present invention relates to a wireless communication system which uses multiple carriers, and more particularly, to a data communication method in a wireless communication system which uses multiple carriers.

BACKGROUND ART

In case of a broadband communication system, more effective transmission and reception schemes in time, space and frequency domains and their application methods have been suggested to maximize efficiency of limited radio resources. In particular, an orthogonal frequency division multiplexing (OFDM) scheme based on multiple carriers is advantageous in that spectral efficiency can be maximized through selective scheduling in a frequency domain using different channel features of subcarriers along with reduction of complexity in a receiver under an environment of frequency selective fading generated in a broadband channel. In addition, the OFDM scheme has received attention as a scheme for enhancing efficiency of radio resources in a frequency domain as the OFDM scheme can be enlarged into an OFDMA scheme through allocation of different subcarriers to a plurality of users. Examples of the standardizations based on OFDMA include IEEE 802.16-2004 which is defined to target fixed subscriber mobile stations in IEEE 802.16 of IEEE (Institute of Electrical and Electronics Engineers) and IEEE 802.16e-2005 correction standardization for providing mobility of subscriber mobile stations. These standardizations adopt a time division duplex (TDD) scheme as a duplexing scheme for dividing an uplink from a downlink. The TDD scheme allocates different time domains to respective links and uses the same frequency band for a corresponding time period, wherein each of the time domains is divided by a guard time. Although the TDD scheme cannot transmit data to the uplink and the downlink simultaneously, it dynamically allocates uplink and downlink time domains. Accordingly, the TDD scheme has excellent flexibility and thus is suitable for asymmetrical transmission. Also, the TDD scheme has drawbacks in that since the uplink and the downlink are divided from each other depending on time, exact synchronization between base stations is required, a cover domain is reduced due to delay in propagation, and it is difficult to support a moving speed of high speed. However, the TDD scheme is advantageous in that smart antenna, link adaptive scheme, and line compensation scheme are easily applied to the TDD scheme due to asymmetrical channel features of the uplink and the downlink. Thus, link budget can be improved through this advantage.

FIG. 1 illustrates a logical frame structure of the legacy IEEE 802.16e system. As shown in FIG. 1, the logical frame structure of the legacy IEEE 802.16e system includes a preamble, a frame control header (FCH), a control signal unit of a downlink/uplink MAP (DL/UL MAP), and a data burst. Data transmission of each user is defined by different subcarrier allocation schemes (PUSC, (O-) FUSC, TUSC, AMC, etc.) depending on a method for configuring subchannels. Various permutation zones can be configured within one frame. Also, a transmit transition gap (TTG) (121.2 µs) and a receive transition gap (RTG) (40.4 µs) which are guard time periods for dividing uplink transmission time from downlink transmission time are inserted between the downlink and the uplink in the middle of the frame and at the last of the frame.

The preamble is used for initial synchronization, frequency offset, channel estimation, and cell ID acquisition (cell retrieval). The FCH provides channel allocation information and channel coding information, which are related to the DL-MAP. The DL/UL-MAP provides channel allocation information of the data burst in the uplink and the downlink.

FIG. 2 illustrates a frame structure which includes multiple permutation zones in accordance with a subchannel allocation mode of the legacy IEEE 802.16e system.

In the logical frame structure except for the preamble, a subchannel allocation mode is selected considering frequency diversity gain, scheduling gain, pilot overhead, or easiness in application of multiple/adaptive antennas. Various permutation zones are configured through zone_switch_IE in the MAP. Examples of the subchannel allocation mode include a Full Usage SubChannel (FUSC) mode, an Optional-FUSC mode, a Partial Usage SubChannel (PUSC), a diversity subchannel mode, and an adaptive modulation and coding (AMC) subchannel mode. In FIG. 2, a zone X is necessarily required per frame, and a zone Y may be required per frame if necessary.

For example, in the DL-MAP, a base station transmits DIUC=15 which includes STC_DL_ZONE_IE( ) to indicate a specific permutation and a transmission diversity mode, which should be required for later allocation. In the UL-MAP, the base station transmits UIUC=15 included in UL_ZONE_IE( ) to report that a specific permutation should be used for subsequent allocation. A data transmission interval (burst) of the downlink is divided into a PUSC subchannel interval, a diversity subchannel interval, and an AMC subchannel interval. A data transmission interval (burst) of the uplink is divided into a diversity subchannel interval and an AMC subchannel interval.

FIG. 3 illustrates a resource structure of the IEEE 802.16e system within a random continuous or dispersed band.

A preamble, an FCH, and a DL-MAP are necessarily required for transmission and reception of each frame. In this case, exact acquisition of data or control information within the frame is performed. When considering the aforementioned frame structure of the IEEE 802.16e system, the legacy 802.16e system is configured and operated within a random frequency band as illustrated in FIG. 3A and FIG. 3B. As illustrated in FIG. 3A, a single mode of the IEEE 802.16e system can use a frequency band through repetition of the legacy structure within the continuous or dispersed band. As illustrated in FIG. 3B, a dual mode which exists along with a new system mode is configured by an independent resource structure through separate channel allocation. In FIG. 3B, 'B' represents a zone where the legacy IEEE 802.16e system is operated, and 'A' represents a zone where a new evolution system is operated.

However, when considering resource allocation and frame structure of the IEEE 802.16e system, a simultaneous use of the legacy system mode and the new evolution system mode within a random allocation band is repeated or needs independent signal processing. In this case, a problem occurs in that it is difficult to use limited radio resources effectively. Particularly, as overhead of a control signal such as FCH or DL-MAP at the front of the frame is repeatedly used, data transmission capacity of the system is reduced. Also, it is difficult to configure flexible channels within various bandwidths in application of the new evolution system mode. Accordingly, a data communication method of a flexible channel structure and a flexible frame structure is required, which maximizes efficiency of time-frequency resources and at the same time covers the new evolution system effectively and enables the new evolution system to be independently functioned in a multiple access system, which uses multiple frequencies, such as the legacy IEEE 802.16e system.

DISCLOSURE OF THE INVENTION

Accordingly, the present invention is directed to a data communication method capable of supporting a new evolution system based on a multiple carrier multiple access in a legacy multiple carrier multiple access system, which substantially obviates one or more problems due to limitations and disadvantages of the related art.

An object of the present invention is to provide a data communication method applicable to allocation of various frequency bands.

Another object of the present invention is to provide a method of allocating control information for supporting a second system to first control information of a first system and a method of transmitting and receiving data to and from a mobile station in a mobile communication system.

To achieve these objects and other advantages and in accordance with the purpose of the invention, as embodied and broadly described herein, a wireless communication system which uses multiple carriers transmits control information for a first system mode and a second system mode to at least one mobile station, which supports a first system, through a first channel resource zone belonging to a first frequency band, and performs data transmission and reception with at least one mobile station through downlink and uplink resources allocated to each system mode in accordance with control information.

According to another feature of the present invention, a wireless communication system which uses multiple carriers transmits and receives control information for a first system mode and control information for a second system through channel resource zones belonging to a specific frame where the first system mode and a second system mode are simultaneously operated, and performs data transmission and reception with at least one mobile station which supports at least one of the first system mode and the second system mode, through downlink and uplink resources allocated from each system mode in accordance with the control information.

According to other feature of the present invention, in a wireless communication system which uses multiple carriers, a mobile station which supports at least one of a first system mode and a second system mode receives control information through channel resources allocated from the first system mode or the second system mode and performs data transmission and reception with the systems.

In one aspect of the present invention, a data communication method according to a dual mode of a first system mode and a second system mode in a wireless communication system which uses multiple carriers includes transmitting first control information for the first system mode and second control information for the second system mode to at least one mobile station which supports a first system, through a first channel resource zone belonging to a first frequency band used in the first system mode; transmitting downlink data to at least one mobile station which supports the first system mode, through a first downlink channel resource of the first frequency band, in accordance with the first control information; and transmitting downlink data to at least one mobile station which supports the second system mode, through a second downlink channel resource of a second frequency band used in the second system mode or the first frequency band, in accordance with the second control information.

In another aspect of the present invention, a data communication method of a mobile station which supports a dual mode of a first system mode and a second system mode in a wireless communication system which uses multiple carriers includes receiving first control information for the first system mode and second control information for a second system through a channel resource zone of a first system; receiving downlink data of the first system through the channel resource zone of the first system in accordance with the first control information; and receiving downlink data for the second system mode through the channel resource zone of the first system or a channel resource zone of the second system in accordance with the second control information.

In still another aspect of the present invention, a data communication method according to a dual mode of a first system mode and a second system mode in a wireless communication system which uses multiple carriers includes transmitting first control information for the first system mode to at least one first mobile station which supports the first system mode, through a first channel resource zone belonging to a specific frame; transmitting downlink data to the at least one first mobile station which supports the first system mode, through a second channel resource zone belonging to the frame in accordance with the first control information; transmitting second control information for the second system mode to at least one second mobile station which supports the second system mode, through a third channel resource zone belonging to the frame; and transmitting downlink data to the at least one second mobile station which supports the second system mode, through a fourth channel resource zone belonging to the frame in accordance with the second control information.

In further still another aspect of the present invention, a data communication method according to a dual mode of a first system mode and a second system mode in a wireless communication system which uses multiple carriers includes receiving first control information for the first system mode through first channel resource zone belonging to a specific frame; receiving downlink data of the first system mode through a second channel resource zone belonging to the frame in accordance with the first control information; receiving second control information for the second system mode through a third channel resource zone belonging to the frame; and receiving downlink data of the second system mode through a fourth channel resource zone belonging to the frame in accordance with the second control information.

BEST MODE FOR CARRYING OUT THE INVENTION

Hereinafter, structures, operations, and other features of the present invention will be understood readily by the preferred embodiments of the present invention, examples of which are illustrated in the accompanying drawings.

Embodiments described later are examples in which technical features of the present invention are applied to new evolution systems which include legacy IEEE 802.16e system and IEEE 802.16m system, wherein the IEEE 802.16e system is the standardization of a multiple carrier multiple access system considering mobility of a mobile station, and the IEEE 802.16m system is the improved wireless standardization of the IEEE 802.16e system and is defined as a new evolution system. Although the above systems have adopted a TDD scheme as a duplexing scheme, the present invention can be applied to a FDD scheme. Accordingly, the present invention can be applied to a broadband wireless communication system which uses multiple carriers, such as long term evolution (LTE) of WCDMA, without being limited to a duplexing scheme. Also, techniques which will be described later can be used for various communication service systems. A communication system according to the embodiment of the present invention can be used to provide various communication services such as voice and packet data. Also, the techniques which will be described later can be used for a downlink or an uplink. The downlink means communication from a system (hereinafter, referred to as "base station") which includes a base station to a mobile station while the uplink means communication from the mobile station to the base station.

Embodiments which will be described later illustrate a united frame structure design which supports the legacy 802.16e system mode and at the same time can be applied to the new evolution system such as 802.16m system. Also, a new frame structure for design of an efficient control signal is designed considering the following requirements on a time-frequency resource structure.

First, the legacy system mode should be supported within a band where the legacy IEEE 802.16e system mode is used.

Second, the legacy system mode and the new evolution system mode should coexist within a single band.

Third, if the legacy system mode coexists with the new evolution system mode, performance degradation should not be generated in the mobile station of the legacy system mode.

Fourth, the new evolution system mode should be operated independently. In this case, an additional control signal should be generated within the minimum range.

Fifth, a flexible channel structure design that can be supported within a continuous or dispersed frequency band is required.

Finally, a control signal design which facilitates support of a mobile station of a single or dual mode is required. In this case, the single mode means that the legacy system is only operated while the dual mode means that the legacy system and the new evolution system are operated simultaneously.

Figure 4:
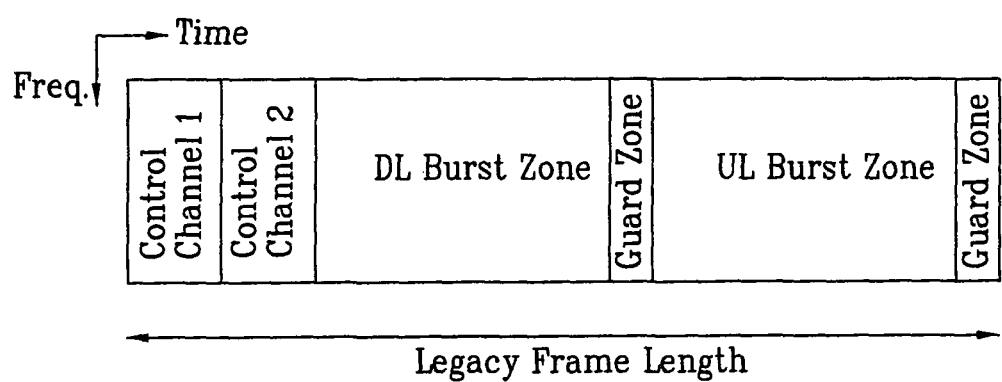
FIG. 4 illustrates a frame structure of a general TDD system.

FIG. 4 illustrates a frame structure of a general TDD system.

The frame structure of the TDD system is divided into control information, burst zones which are user data zones, and guard zones for dividing a downlink and an uplink from each other.

The control information includes a preamble, information related to channel allocation of data burst, and frame information. The control information can be divided into information broadcasted to all mobile stations and information broadcasted to a specific mobile station. The control information broadcasted to all mobile stations is allocated to a first control channel while the control information broadcasted to a specific mobile station is allocated to a second control channel.

The first control channel is allocated with the preamble. The preamble is used for initial synchronization, frequency offset, channel estimation, and cell retrieval, as described above.

The second control channel is allocated with channel allocation information of data burst in the uplink/downlink, channel allocation information related to provide the above information, and channel coding information. The second control channel is also allocated with a bandwidth of a current frame, size (N) of FFT, the number of bandwidths, Bin information per bandwidth, and so on. In the IEEE 802.16e system, DL-MAP represents channel allocation information of data burst in the uplink/downlink, and FCH provides channel allocation information and channel coding information related to the DL-MAP. Also, a DL frame prefix (DLFP) provides information of the frame which is currently transmitted.

A DL burst zone means a data transmission interval in the downlink. All resource allocation schemes of multiple carrier multiple access, such as FUSC scheme, optional-FUSC scheme, PUSC scheme, diversity subchannel scheme and AMC subchannel scheme, can be used for allocation of OFDMA resources in the DL burst zone.

The guard zones are guard times for dividing the DL burst zone from the UL burst zone, and are defined within the minimum requirement range in accordance with a duplexing scheme in case of the IEEE 802.16e system. The guard zones can also be defined within such a minimum requirement range in case of the embodiments according to the present invention. RTG and TTG of the TDD scheme require the guard zone in the range of 50 µs or less. A half-duplex FDD (H-FDD) scheme requires the guard zone in the range of 100 µs or less.

A UL burst zone means a data transmission interval in the uplink. FUSC scheme, optional-FUSC scheme, PUSC scheme, diversity subchannel scheme and AMC subchannel scheme can be used for allocation of OFDMA resources in the UL burst zone.

Figure 5A:
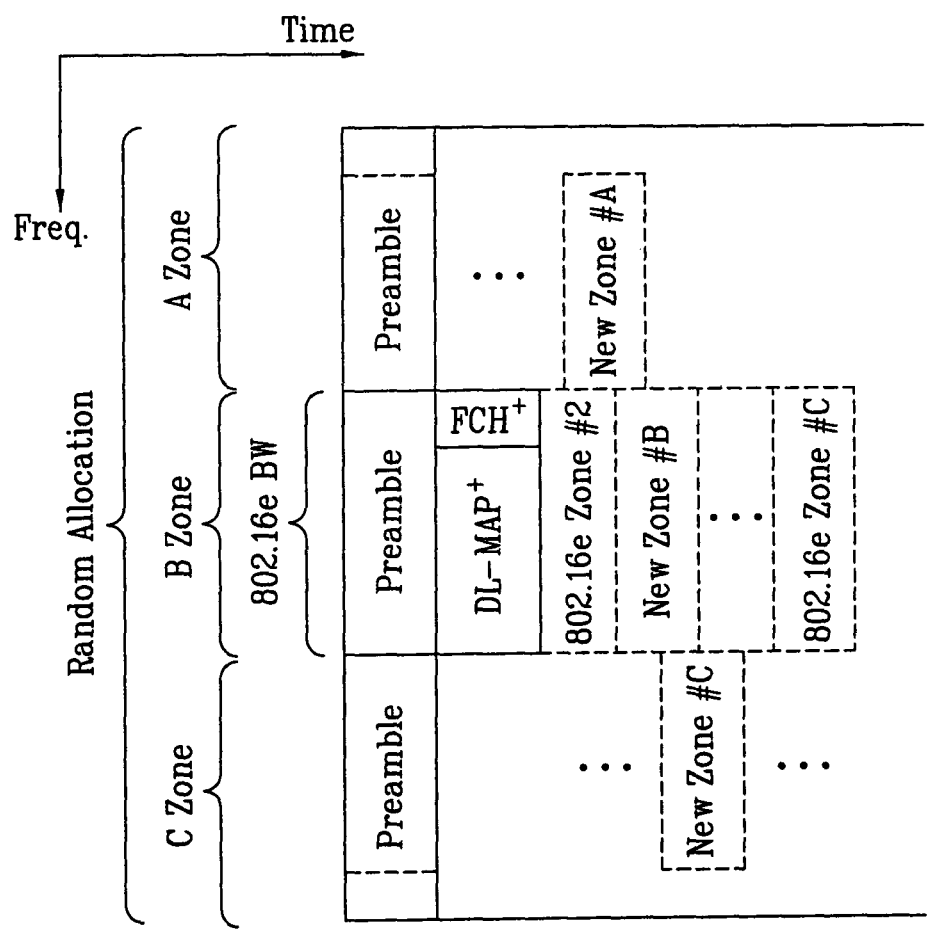
FIG. 5A illustrates a basic frame structure suggested in the present invention when IEEE 802.16e system mode and a new evolution system mode coexist.
Figure 5B:
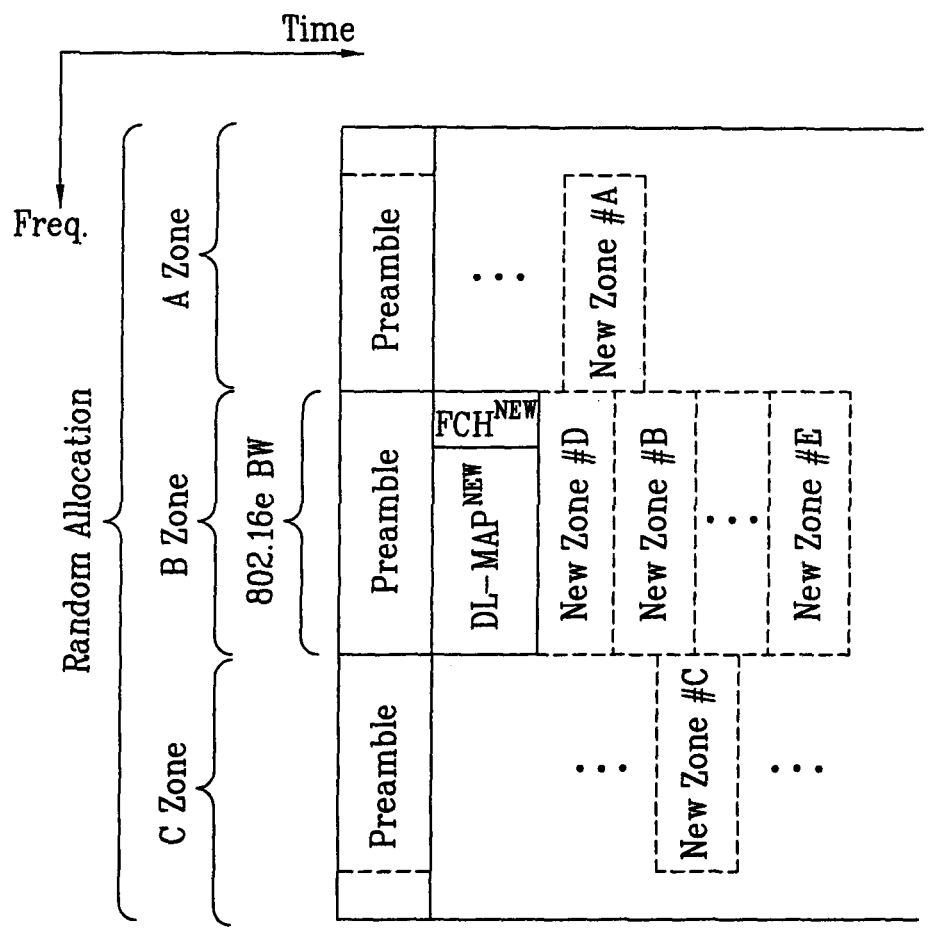
FIG. 5B illustrates a basic frame structure suggested in the present invention when a new evolution system mode is independently configured.

FIG. 5A and FIG. 5B illustrate a basic frame structure suggested in accordance with the embodiment of the present invention.

A single frame structure of a single or dual mode can be configured through the basic frame suggested in accordance with the embodiment of the present invention, which supports dual data communication of the legacy IEEE 802.16e system and the new evolution system. Actions of the basic frame structures suggested in FIG. 5A and FIG. 5B can be identified through embodiments of channel structures set in various situations such as the case where the legacy IEEE 802.16e system mode and the new evolution system mode coexist within a continuous or dispersed band and the case where the new evolution mode is only operated within the continuous or dispersed band.

For the embodiment of the present invention, enlarged control channels and new data burst are defined as follows, and are allocated to the first control channel or the second control channel in the same manner as the legacy system.

$FCH^\dagger$ is an enlarged header of the legacy IEEE 802.16e system and provides information of the legacy DL-MAP and $DL\text{-}MAP^{new}$.

$FCH^{new}$ is a header for supporting the new evolution system and provides information of the $DL\text{-}MAP^{new}$.

$DL\text{-}MAP^\dagger$ is an enlarged control channel of DL-MAP of the legacy IEEE 802.16e system and provides data burst allocation information to the control channel which includes legacy DL-MAP and $DL\text{-}MAP^{new}$ for the new evolution system.

$DL\text{-}MAP^{new}$ provides allocation information of data burst defined in the new evolution system.

$DL\text{-}MAP^{new}$ length represents the number of symbols (or slots) allocated for $DL\text{-}MAP^{new}$. In this case, symbols mean OFDM symbols, OFDM subcarriers, or OFDM subchannels. A symbol interval where subcarriers constituting subchannels exist is defined by slots. Accordingly, the length of the slots depends on types of subchannels which divide the uplink from the downlink.

New_Zone #k represents a new permutation zone to which a method of generating a kth subchannel defined in a new mode is applied.

$DL\text{-}MAP_k^{new}$ provides DL-MAP information dedicated for New_Zone #k.

$DL\text{-}MAP_k^{new}$ IE provides frequency and time offset information of $DL\text{-}MAP_k^{new}$ for New_Zone #k.

Mode indicator provides configuration information of the legacy system mode and the new evolution system mode within an allocation band.

Referring to FIG. 5A, the preamble is allocated to the first control channel in accordance with the 802.16e system, and enhanced FCH and DL-MAP are allocated to the second control channel for operation between heterogeneous modes. Hereinafter, the configuration and the operation principle of $FCH^\dagger$ and $DL\text{-}MAP^\dagger$ which are the enhanced FCH and the enhanced DL-MAP of FIG. 5A will be described.

In the embodiment illustrated in FIG. 5A, the legacy system and the new evolution system are served simultaneously over three bands of A, B and C. A preamble of the band B is allocated to the first control channel of the band B, and control information of channel allocation for the downlink and the uplink of the bands A, B and C is carried in the second control channel. A permutation zone to which a method of generating a second subchannel defined in the legacy 802.16e system is applied and a permutation zone to which a method of generating $B_{th}$ and $C_{th}$ subchannels defined in the new evolution system is applied are served in the band B. These permutation zones refer to control information in the band B. On the other hand, in case of the band A and the band C, the preamble allocated to each of the bands A and C is used. Also, since information corresponding to the second control channel for burst for the uplink and the downlink allocated to the bands A and C is allocated to the $FCH^\dagger$ and $DL\text{-}MAP^\dagger$ allocated to the band B, allocation of the second control channel for the band A and the band C is not required.

In the embodiment illustrated in FIG. 5B, burst for the new evolution system is only allocated to the bands A, B and C, and a preamble for each band is allocated to each band in the same manner as FIG. 5A. However, unlike FIG. 5A, the new system is only used for bands X, Y and Z, and $FCH^{new}$ and $DL\text{-}MAP^{new}$ which correspond to second control channel information allocated to the band B can identify channel allocation information for a permutation zone to which a method of generating $A_{th}$, $B_{th}$, $C_{th}$, $D_{th}$, and $E_{th}$ subchannels defined in the new evolution system allocated to the bands A, B and C is applied.

In the embodiment of the present invention, for combined operation between heterogeneous modes, a method of allocating a mode indicator to a control channel of a first system is suggested, wherein the mode indicator indicates a dual operation mode, which is currently used. For example, 1 bit can be allocated as a mode indicator to represent whether the IEEE 802.16e system mode exists within the allocated band as expressed in Equation 1. The mode indicator (or turn-off legacy support indicator) according to the embodiment of the present invention indicates whether to operate the legacy system and the new evolution system in common.

$$\text{Mode Indicator} = \begin{cases} 0, & \text{With IEEE802.16e Mode} \\ 1, & \text{Only Single New Mode} \end{cases} \quad \text{[Equation 1]}$$

The mode indicator can be allocated to the first control channel or the second control channel of the first system. Since the second control channel represents channel allocation information, the mode indicator can be allocated to the FCH of the second control channel. However, the mode indicator can be allocated to the first control channel as described below.

Figure 6:
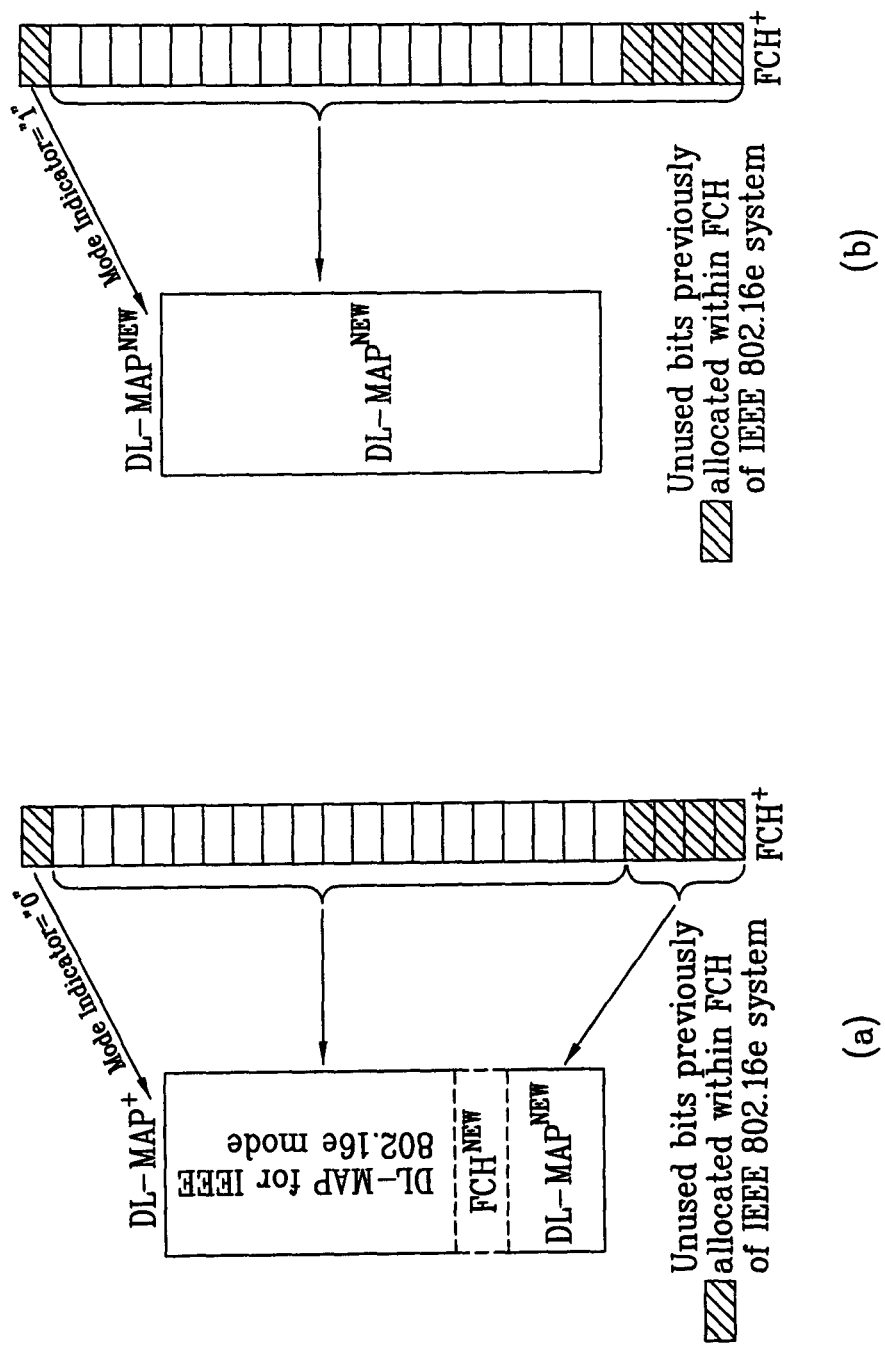
FIG. 6 illustrates a configuration example of $FCH^\dagger$ within a second control channel suggested in accordance with the embodiment of the present invention.

FIG. 6 illustrates an example of the $FCH^\dagger$ in accordance with the embodiment of the present invention.

In the embodiment illustrated in FIG. 6, the mode indicator is allocated to the $FCH^\dagger$ of the second control channel. In the same manner as the embodiment of FIG. 5A, FIG. 6 illustrates the case where the $FCH^\dagger$ which is the control information on the second control channel of the first system is used to simultaneously support the legacy system and the new evolution system. In this case, the new evolution system may use the same band as that of the legacy system, or may use a neighboring bandwidth adjacent to that of the legacy system.

The FCH of the legacy IEEE 802.16e system is transmitted through first four slots in view of PUSC subchannel logical structure. At this time, 24 bits related to the DL-MAP are repeated to configure 48 bits and then mapped with QPSK through convolution coding at a coding rate of ½ and iteration coding of four times. At this time, 5 bits among 24 bits are set to 0 and are not used actually for information transfer. Accordingly, the enlarged $FCH^\dagger$ can provide channel allocation information and channel coding information of the DL-$MAP^\dagger$ by using 5 bits which are not used, for additional control information of the new mode.

As illustrated in the embodiment of FIG. 6, when the mode indicator is set to 0, the remaining 4 bits are used if additional information of DL-$MAP^{new}$ in the DL-$MAP^\dagger$ is needed for the legacy mode and the new mode.

As illustrated in the embodiment of FIG. 6, when the mode indicator is set to 1, it represents a frame structure configured by the new mode only. In this case, $FCH^\dagger$ is used by being defined as 24 bits, or information of a part of 24 bits is used by being defined as DL-$MAP^{new}$.

Alternatively, mode indicator bits may be located within the first control channel to which preamble is allocated, instead of the FCH within the second control channel. In this case, the previously allocated 5 bits (or 4 bits), which are not used, can be used if additional information of the DL-$MAP^{new}$ is needed in the DL-$MAP^\dagger$ of the second control channel.

Furthermore, if the first control channel transmits the mode indicator, more optimized control channel can be designed. For example, if there is no mode indicator in the preamble within the first control channel and there is the mode indicator in the FCH within the second control channel, since a mobile station of the new system cannot identify antenna information/coding information of the FCH interval (whether antenna information/coding information of the FCH interval belongs to the legacy system or the new evolution system), an antenna scheme of the FCH interval should use the same basic features (single antenna, ½-rate convolutional coding) as those of the legacy system.

If the mode indicator can be acquired from the preamble, since the antenna scheme of the FCH interval, which has been improved from the legacy system, can be used, reliability of the control channel can be improved. Supposing that DL-$MAP^{new}$ is transmitted through the same channel coding and modulation scheme as that of DL-MAP dedicated for the IEEE 802.16e system, it can be used to determine the number of additionally required symbols (DL-$MAP^{new}$ Length). If DL-$MAP^{new}$ needs a channel coding and modulation scheme different from that of the DL-MAP, or if 4 bits are not sufficient to represent the number of additional symbols, new $FCH^{new}$ can be allocated after DL-MAP for the legacy mode.

Through $FCH^+$ set as above, the legacy IEEE 802.16e system mode and the new evolution system mode can be supported without change of the frame structure and the control channel. In other words, if the mode indicator is set to 0 and DL-$MAP^{new}$ length is set to 0, the mobile station can be operated in the legacy IEEE 802.16e system mode. If the mode indicator is set to 1, the mobile station can be operated in a single mode of the new system mode only. Also, in case of the mobile station in the IEEE 802.16e system, the legacy structure can be used without degradation of performance even on the frame structure which supports the new evolution system mode. Even the mobile station which supports the new evolution system mode can be operated in a single or dual mode through additional minimum bits for transmission of the control signal.

FIG. 7 illustrates a configuration example of DL-$MAP^{new}$ in accordance with another embodiment of the present invention.

As suggested in accordance with the embodiment of the present invention, DL-$MAP^\dagger$ set through $FCH^\dagger$ transmits allocation information of data burst according to the legacy or new system mode. Since DL-$MAP^{new}$ for new mode control information is transmitted along with the legacy DL-MAP control signal, a problem occurs in that overhead may be concentrated on the front end of the frame to support the new mode which uses relatively broader band. Accordingly, an effective design of DL-$MAP^{new}$ for the new mode is required in accordance with a new subchannel allocation scheme and configuration of a permutation zone. FIG. 7 illustrates embodiments according to the present invention with respect to DL-$MAP^{new}$ within DL-$MAP^\dagger$ so as to solve the above problem. Hereinafter, the embodiments according to the present invention with respect to DL-$MAP^{new}$ within DL-$MAP^\dagger$ will be described.

Figure 7A:
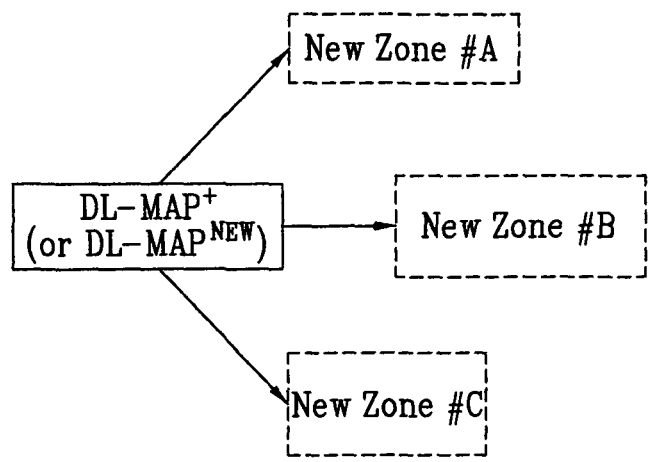
FIG. 7A illustrates a configuration example of $DL\text{-}MAP^+$ within a second control channel suggested in accordance with the embodiment of the present invention.

As illustrated in FIG. 7A, if DL-$MAP^\dagger$ (or DL-$MAP^{new}$) has resources sufficient to transfer allocation information of New_Zone #k which is a new permutation zone to which a method of generating kth subchannel defined in the new evolution system and allocated to either the same band as that of the legacy system or a continuous or dispersed band, OFDM subcarriers and symbol offset information of New_Zone #k can be identified through DL-$MAP^+$ (or DL-$MAP^{new}$) in the same manner as the legacy IEEE 802.16e system, whereby the mobile station transmits DL-$MAP^+$ (or DL-$MAP^{new}$).

Figure 7B:
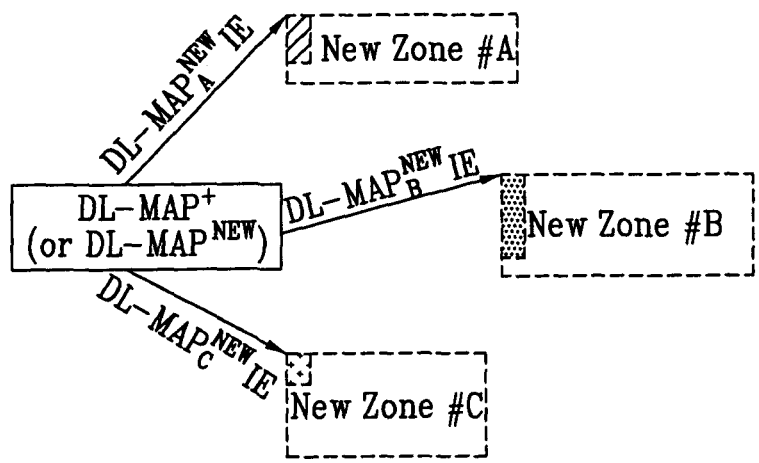
FIG. 7B illustrates another configuration example of $DL\text{-}MAP^+$ within a second control channel suggested in accordance with the embodiment of the present invention.

However, in order to reduce load of the legacy IEEE 802.16e system mode due to increase of overhead at the front end of the frame, DL-$MAP_k^{new}$ is prefixed to the front end during design of New_Zone #k, thereby obtaining information related to channel allocation information of New_Zone #k through the prefix and allowing the DL-$MAP^+$ (or DL-$MAP^{new}$) to transmit DL-$MAP_k^{new}$IE, which is frequency and time offset information, to each New_Zone #k. As illustrated in FIG. 7B, in a state that load of DL-$MAP^\dagger$ (or DL-$MAP^{new}$) is reduced through prefix transmission for each New_Zone #k, the new system mode can be operated. The new mode can be supported through the structures of $FCH^\dagger$ and DL-MAP† suggested in FIG. 6 and FIG. 7. Also, loss of efficiency due to control signal transmission can be minimized by transmitting additional control signal information together with the legacy control signal. If a single mode is needed, the current system can be easily converted into the IEEE 802.16e system mode or the new system mode, whereby it is easy to maintain performance of each mode.

Figure 8A:
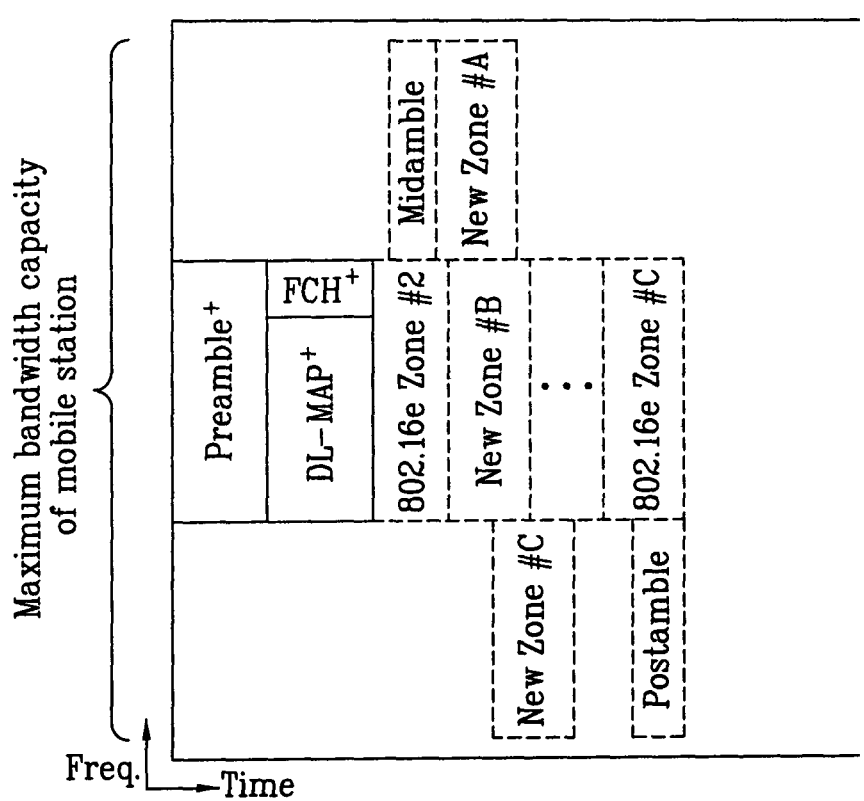
FIG. 8A illustrates an example of position change of a preamble and $preamble^\dagger$ within a first control channel for diversity effect in a frame structure within a continuous band according to receiving bandwidth capacity of a mobile station.
Figure 8B:
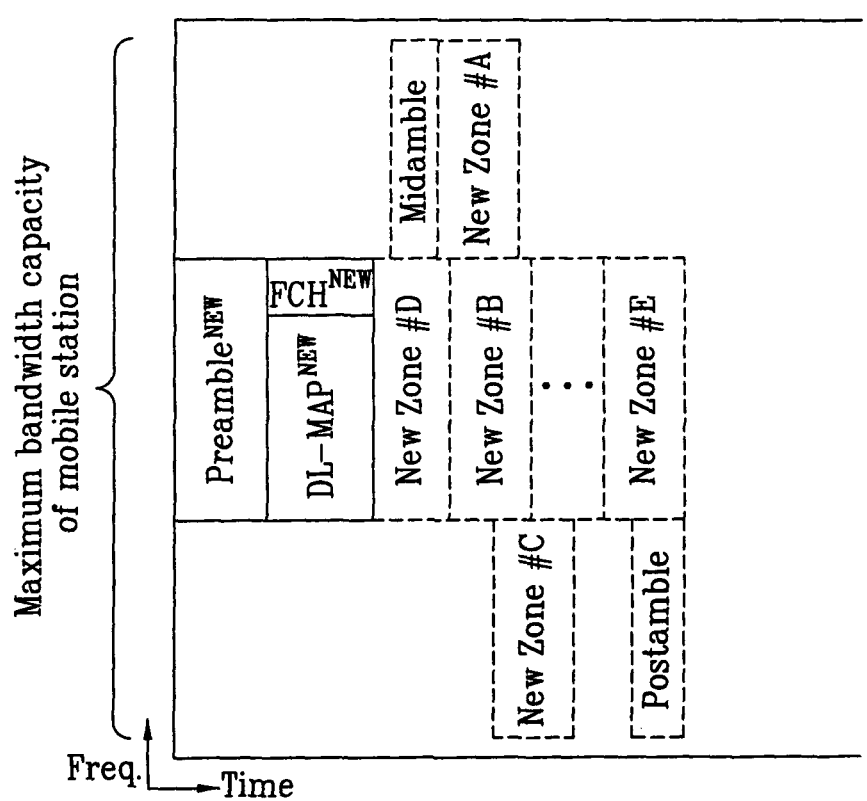
FIG. 8B illustrates an example of position change of a preamble and $preamble^{new}$ within a first control channel for diversity effect in a frame structure within a continuous band according to receiving bandwidth capacity of a mobile station.

FIG. 8A and FIG. 8B illustrate frame structures according to another embodiment of the present invention.

If the legacy IEEE 802.16e system mode and the new evolution system mode coexist within the continuous band, the frame can be configured as illustrated in FIG. 5A. In connection with a preamble of the frame according to the embodiment of the present invention suggested in FIG. 8A and FIG. 8B, cell ID and synchronization acquisition and channel estimation can be performed through either the preamble of the legacy IEEE 802.16e system or a newly allocated preamble (Preamble$^{new}$ in FIG. 8B). Also, instead of using the legacy preamble to support the legacy system (for example, IEEE 802.16e) only, a preamble (or midamble, postamble) of the new evolution system (for example, IEEE 802.16m) multiplexed with the legacy preamble in a time division multiplexing (TDM) type can be defined newly (Preamble† in FIG. 8A). In this case, the following advantages can be obtained.

First, since the new evolution system (for example, 802.16m) occupies a frequency domain wider than that of the legacy system (for example, 802.16e), it is possible to obtain frequency diversity effect. In other words, since channel estimation of the control signal such as FCH or DL-MAP is performed through the preamble, the frequency domain wider than that of the legacy system (for example, 802.16e) can be used, whereby efficiency and frequency diversity gain can be obtained.

Second, it is possible to design a new preamble improved from the legacy preamble. For example, it is possible to transmit a preamble of a new system to a start part of a traffic zone (new zone, for example, 802.16m zone) of the new evolution system, or transmit the preamble of the legacy system to next symbol or the preamble of the new system to a previous symbol.

When the preamble is newly allocated, the preamble may be arranged in the middle of the frame or at the last of the frame like midamble or postamble without being arranged at the front end of the frame. In this case, it is advantageous in that diversity effect can be obtained through channel estimation corresponding to the function of the preamble. This can be applied to the dispersed band scheme which will be described later. As will be described later, it is possible to allocate the preamble in a type of midamble or postamble in the frame structure, which supports a dual mode between heterogeneous modes through modification of a frequency allocation unit, while maintaining frequency allocation restriction requirements.

In the embodiment according to the present invention, if the legacy IEEE 802.16e mode and the new mode coexist within the dispersed band, a new frame can be configured by applying the aforementioned frame structure within the continuous band. In other words, if two modes coexist within a specific band of the dispersed band, the structure of FIG. 5A can be designed, and the structure of FIG. 5B can be configured if a single mode is needed. The transmission scheme of the control signal within the dispersed band is determined by channel receiving bandwidth capacity of the mobile station. If signal reception and demodulation can be performed within a plurality of dispersed bands, the control signal within the corresponding band can be transmitted through FCH† and DL-MAP† within a second control channel. If the receiving bandwidth capacity is relatively small, control signal transmission is required within each band.

Figure 9A:
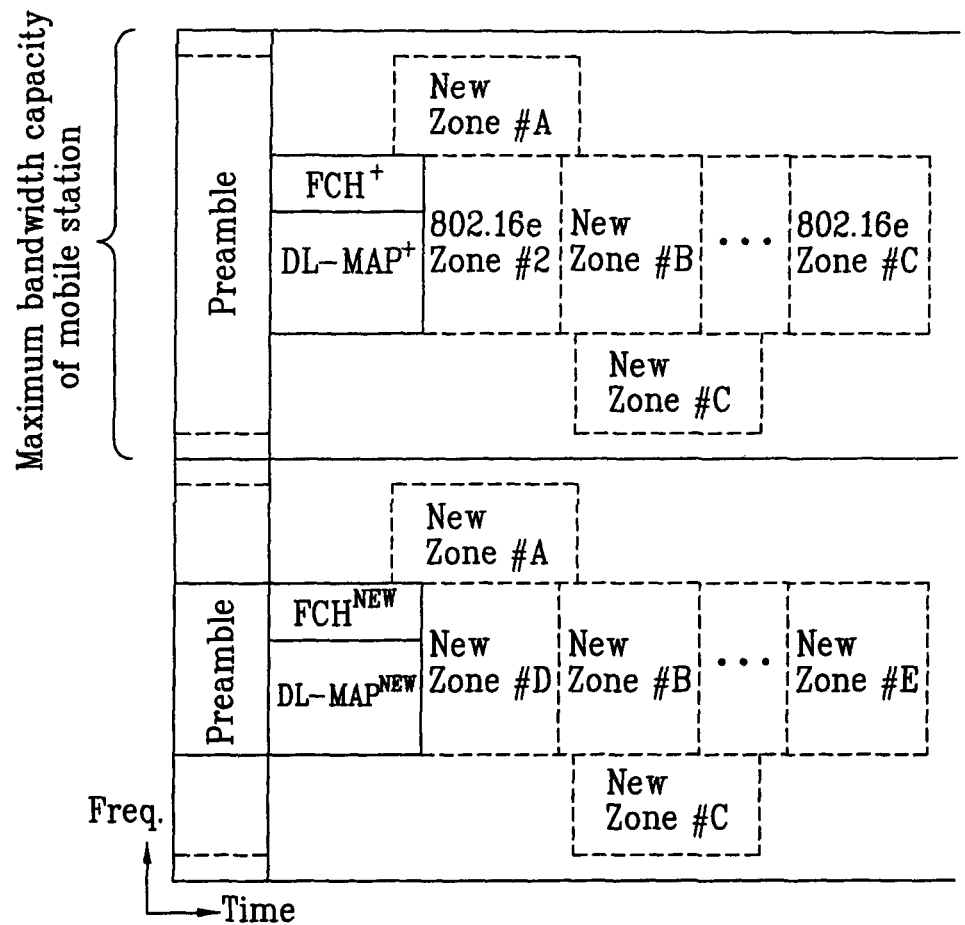
FIG. 9A illustrates a frame structure within a continuous band suggested in accordance with the embodiment of the present invention when receiving bandwidth capacity of a mobile station corresponds to three bands.
Figure 9B:
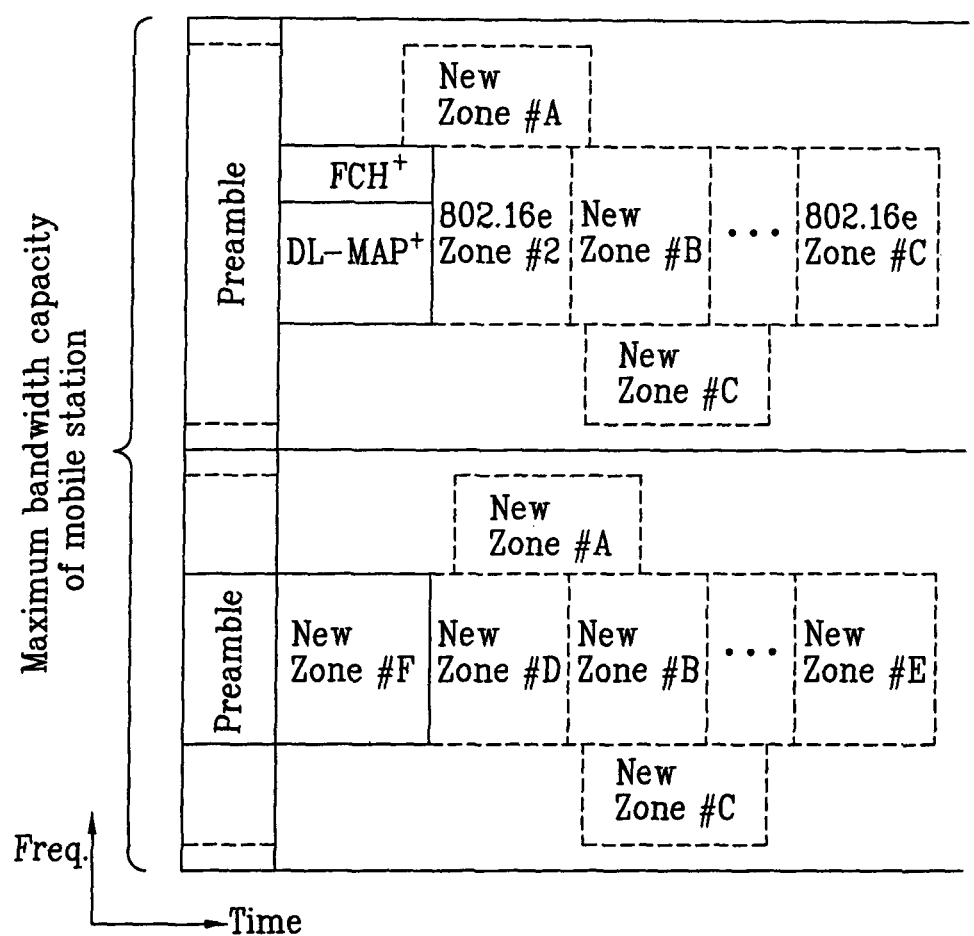
FIG. 9B illustrates a frame structure within a continuous band suggested in accordance with the embodiment of the present invention when receiving bandwidth capacity of a mobile station corresponds to six bands.

FIG. 9A and FIG. 9B illustrate embodiments to which frame structures suggested in accordance with the embodiment of the present invention are applied within a continuous band according to the receiving bandwidth capacity of the mobile station. As illustrated in FIG. 9A, since the receiving bandwidth capacity of the mobile station is limited to three bands, it is noted that a dual mode in three upward bands can be controlled by the second control channel (FCH† and DL-MAP†) only but transmission of control information of a new mode only corresponding to three continuous bands is required separately through a new second control channel within a corresponding band. However, it is noted that if the receiving bandwidth capacity of the mobile station corresponds to six bands as illustrated in FIG. 9B, control information of the dual mode and the single mode of the new system only can be identified by the second control channel (FCH† and DL-MAP†) only.

Figure 9C:
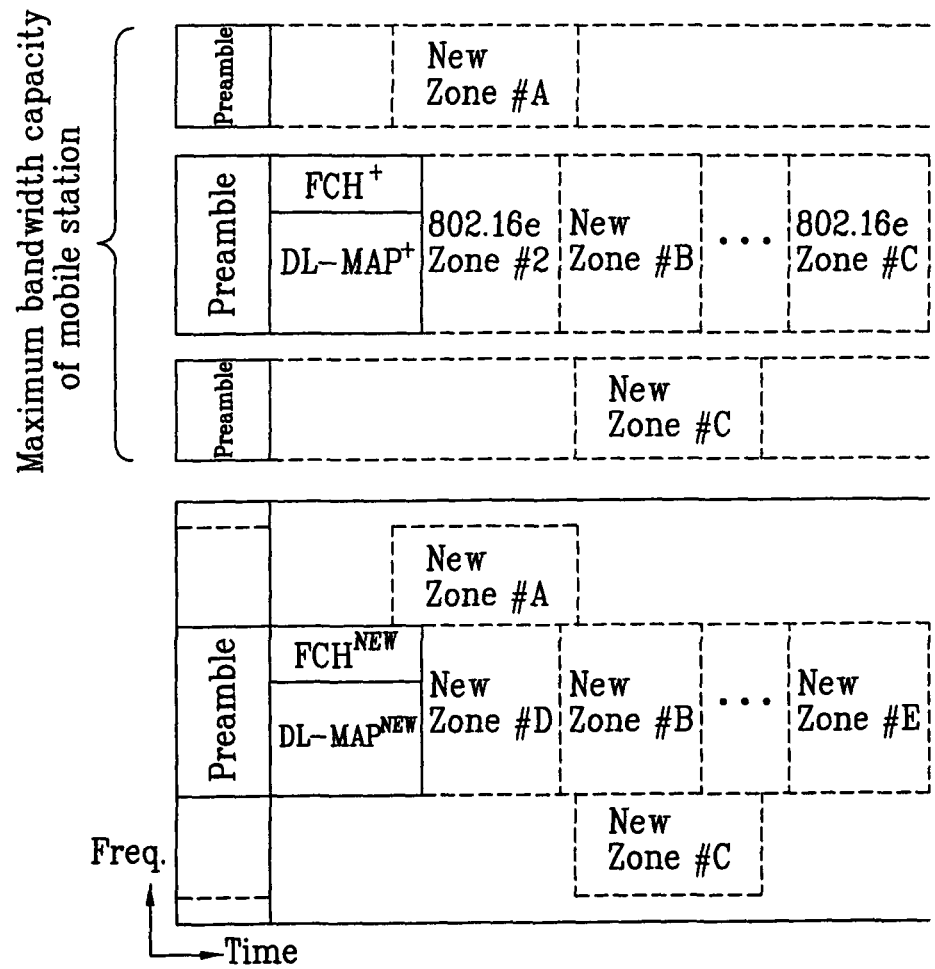
FIG. 9C illustrates a frame structure within a dispersed band suggested in accordance with the embodiment of the present invention when receiving bandwidth capacity of a mobile station corresponds to three bands.
Figure 9D:
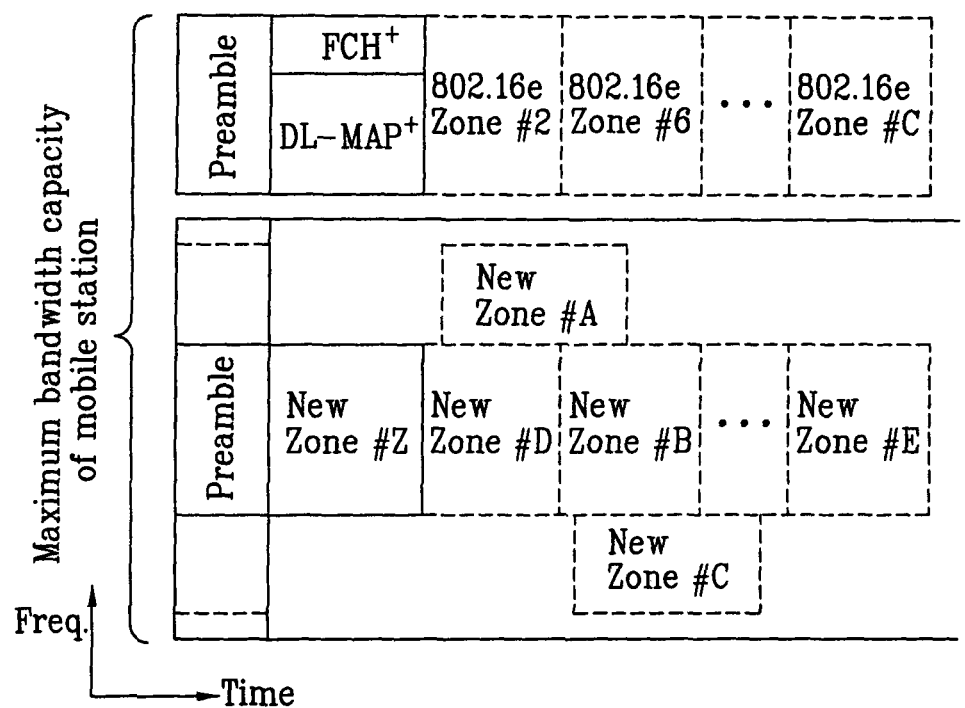
FIG. 9D illustrates a frame structure within a dispersed band suggested in accordance with the embodiment of the present invention when receiving bandwidth capacity of a mobile station corresponds to six bands.

FIG. 9C and FIG. 9D illustrate embodiments to which frame structures suggested in accordance with the embodiment of the present invention are applied within a dispersed band according to the receiving bandwidth capacity of the mobile station. The detailed operation illustrated in FIG. 9C and FIG. 9D can be referred to the description of FIG. 9A and FIG. 9B.

Figure 10:
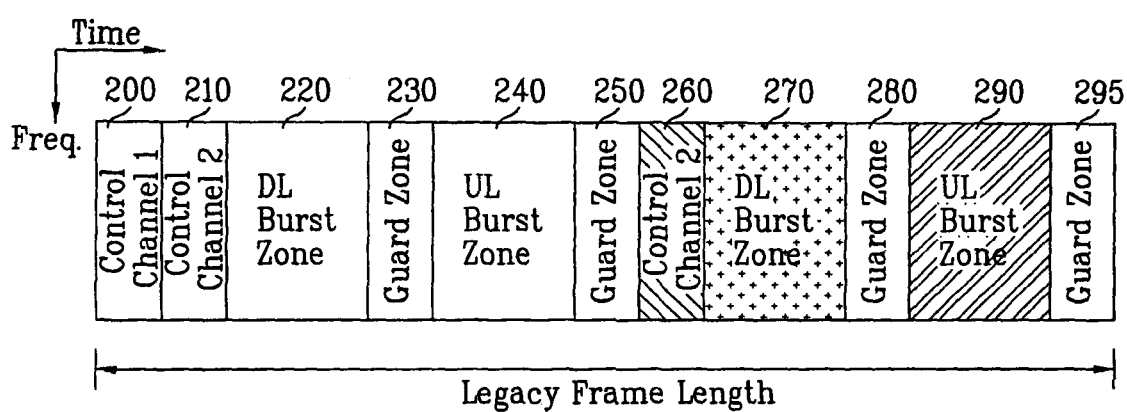
FIG. 10 illustrates a frame structure according to the embodiment of the present invention to support a heterogeneous mode while FA restriction requirements of a legacy system are maintained in case of a TDD scheme.

FIG. 10 illustrates a frame structure which supports a dual mode in accordance with another embodiment of the present invention.

The embodiment of FIG. 10 illustrates the frame structure according to the embodiment of the present invention, which supports the new evolution system through modification of frequency allocation unit while maintaining frequency allocation restriction requirements of the legacy system in the TDD mode. When considering a method for improving performance of the system while supporting the legacy system, it is recognized that continuous support of the mobile station which has been typically served is required. Through this recognition, a service provider can prevent subscribers from unsubscribing due to exchange expense of the mobile station by supporting the legacy mobile station, thereby enabling introduction of a new system. If the service provider has started a service with respect to the legacy system which uses the TDD mode, such as the IEEE 802.16e system, the mobile station which uses the service provided from the service provider performs retrieval of a frequency band in accordance with use model and frequency allocation (FA) previously defined for the frequency which the service provider uses. In other words, the mobile station performs sequential retrieval with respect to available FA and receives a frame of the base station through a proper basis.

Accordingly, if the service starts using the structure of the type suggested in FIG. 4, upgrade of the new system causes problems in that use restrictions occur with respect to FA of the legacy system and it is difficult to support the legacy mobile station if the mobile station violates the use restrictions. In order to provide a new service from such restrictions while supporting the mobile station of the legacy system, a new structure based on the operation of the legacy mobile station is required. In other words, it is possible to configure a structure which has modification of a time axis and modification of FA unit while maintaining the FA restriction requirements.

To maintain compatibility of FA unit, the following two types in the frame structure can be configured.

First, as described above, the frame structure of the legacy system is used for at least one band which will be used by the legacy mobile station, and the mobile station which has received the legacy service is induced to receive the service through this band only. In this case, it has been described that a new service can be supported through a new mode from additional FA or the legacy system mode.

Figure 11:
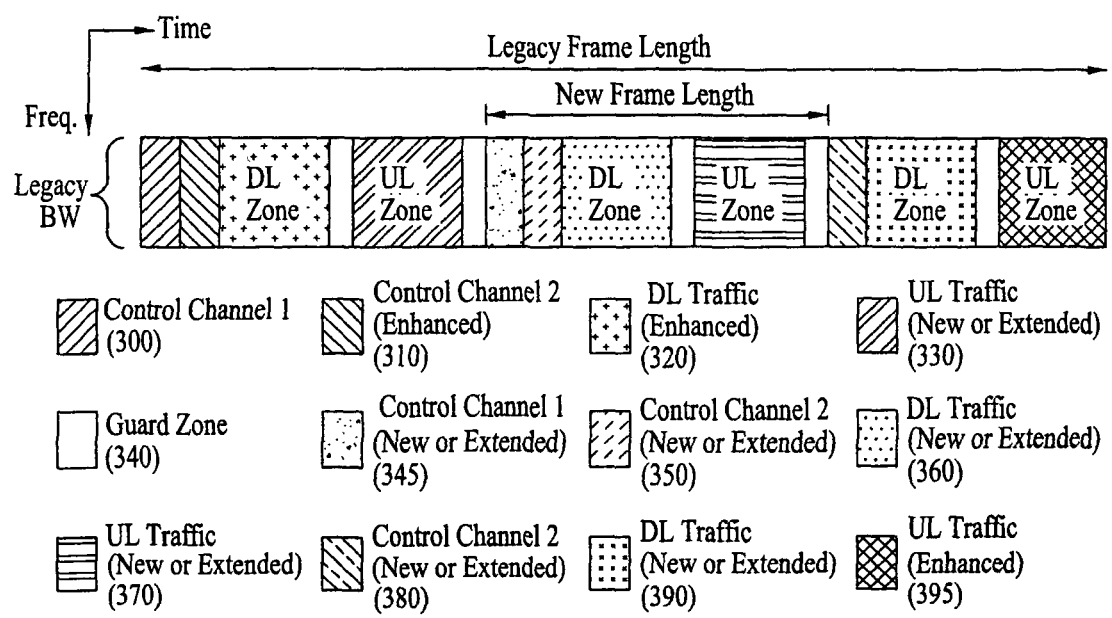
FIG. 11 illustrates an example of applying a new frame structure to a legacy frame structure while legacy FA restriction requirements are maintained in case of a TDD scheme.
Figure 12:
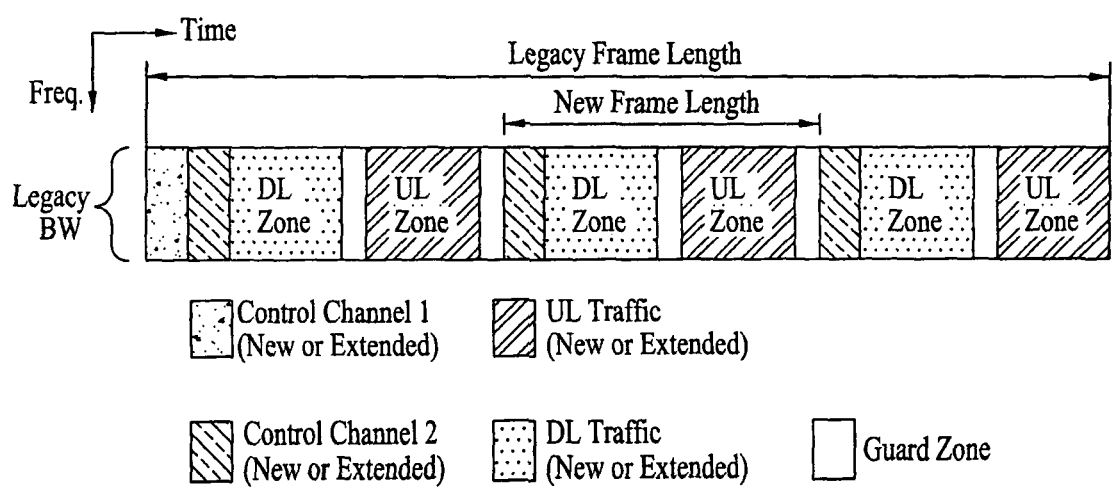
FIG. 12 illustrates an example which supports a frame structure of a new system only while legacy FA restriction requirements are maintained in case of a TDD scheme.

Second, as illustrated in FIG. 10, FIG. 11 and FIG. 12, a frame structure which does not affect an access mode of the legacy mobile station to the system is used for every FA. In other words, the legacy mobile station can equally access every FA which has been conventionally used, in a state that the legacy mobile station does not know modification of the system. However, the mobile station which has been newly upgraded can know the modified system.

The frame structure suggested in accordance with the embodiment of the present invention has an enhanced feature that modification of FA unit is reflected and at the same time the aforementioned FA restriction requirements are maintained. In FIG. 10, a new frame structure is defined and inserted to the legacy frame structure. To this end, if support of the legacy system is needed, the legacy system should use a common channel (control channel, such as preamble and SCH, required to identify synchronization and basic cell information) without any modification. However, if the legacy mobile station reaches a level (backward compatible or transparent extension) having no problem in detecting a cell and performing synchronization, the legacy system can use a channel of an enlarged type. Also, if the function of the legacy system can be improved for the control channel 2 and DL/UL traffic zones without any problem in supporting the legacy system, the improved type can be used.

In FIG. 10, a reference numeral 200 represents a first control channel of the legacy system, and a reference numeral 210 represents a second control channel of the legacy system. As illustrated in FIG. 5A and FIG. 5B, in addition to the legacy control information, enhanced control information can be transmitted through the second control channel. Reference numerals 220 and 240 respectively represent DL burst zone and UL burst zone of the legacy system, and reference numerals 230, 250, 280, and 295 represent guard zones which are guard intervals in the TDD system. A reference numeral 260 represents second control channel information for the new evolution system. As first control channel information which includes preamble, the first control channel information of the legacy system may be used, or first control channel information for the evolution mode may be provided separately. Reference numerals 270 and 290 respectively represent DL burst zone and UL burst zone of the evolution system.

FIG. 11 illustrates an example of a new frame structure which can support a dual mode in accordance with another embodiment of the present invention.

Referring to FIG. 11, in order that there is no problem in the operation of the legacy mobile station while FA restriction requirements are maintained, location of resources used by the legacy system may be considered as illustrated in FIG. 11 to maintain the legacy frame structure if possible. That is, DL traffic zone may be located at the first of the frame while UL traffic zone may be located at the last of the frame. However, in this case, compatibility may be deteriorated due to UL/DL rate that may be defined by the legacy mobile station. The UL traffic zone may be located next to the DL zone for the legacy system. Also, the UL traffic zone may be interposed in the new frame structure. In this case, performance of the mobile station having a new feature may be deteriorated. A zone that can additionally be used by the mobile stations which support a new function is defined by a new frame definition unit. In this zone, a random control channel 2 can be used, and DL/UL traffic zones can be defined randomly.

In FIG. 11, "enhanced" means that it supports the legacy system and improves performance by maintaining the basic structure or partially modifying the basic structure. Also, "new or extended" means that a new structure is configured for the new evolution system mode or the legacy structure has been modified but does not support the legacy system mode.

In more detail, in "DL/UL Zones" of FIG. 11, "enhanced" means a structure which maintains the legacy permutation scheme and supports the legacy system by partially modifying subchannelization or pilot structure within the limited range, and "new or extended" means a structure which supports the new evolution system mode only without supporting the legacy system mode by newly mapping subchannelization in the legacy permutation scheme or adding a new pilot structure. Also, "new or extended" includes a zone configured by a new permutation scheme regardless of the legacy permutation scheme.

The embodiment of the present invention illustrated in FIG. 11 will be described below in detail.

A reference numeral 300 represents a first control channel of the legacy system mode, and a reference numeral 310 represents a second control channel (enhanced) for supporting at least one of the legacy system mode and the new evolution system mode. A reference numeral 320 represents a DL burst zone (enhanced) on the legacy system mode controlled by the second control channel 310. A reference numeral 330 represents a UL burst zone (new or extended) on the new evolution system mode controlled by the second control channel 310. A reference numeral 395 represents a UL burst zone (enhanced) on the legacy system mode controlled by the second control channel 310. A reference numeral 345 represents a first control channel (new or extended) for the new evolution system mode, and although not necessarily required, serves as the midamble or postamble described in FIG. 8 if necessary. A reference numeral 350 represents a second control channel (new or extended) for the new evolution system mode. Reference numerals 360 and 370 represent a DL burst zone (new or enhanced) on the new evolution system mode controlled by the second control channel 350 and a UL burst zone (new or enhanced) on the new evolution system mode. A reference numeral 380 represents a second control channel (new or extended) on the new evolution system mode which controls the DL burst zone 390. The reference numeral 390 represents the DL burst zone (new or extended) on the new evolution system mode and is controlled by the first control channel 300 and the second control channel 380. In this case, it will be apparent to those skilled in the art that, although not provided a UL burst zone controlled by the second control channel 380, the UL burst zone may be additionally provided if necessary. A reference numeral 340 represents a guard zone.

FIG. 12 illustrates an example of a frame structure which supports the legacy system but does not perform support of the legacy system unlike FIG. 10 and FIG. 11. If the frame structure is modified as illustrated in FIG. 12, the legacy mobile station is not supported and the system can be operated in a new mode.

Figure 13:
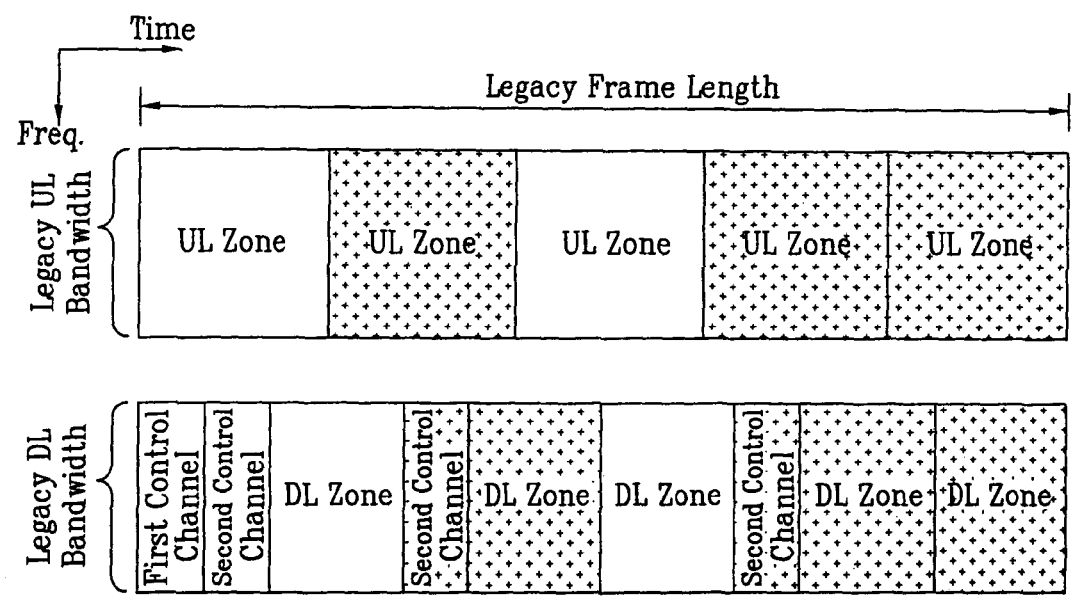
FIG. 13 illustrates a frame structure according to the embodiment of the present invention to support a heterogeneous mode while FA restriction requirements of a legacy system are maintained in case of a FDD scheme.

FIG. 13 illustrates a frame structure suggested in the present invention to support the legacy system and the new evolution system in an FDD scheme.

The method for supporting the legacy system in the TDD scheme has been described above. Unlike FIG. 10, FIG. 11 and FIG. 12, in the FDD scheme, the control channel and DL traffic can be transmitted through one frequency band, and UL traffic can be transmitted through another band. At this time, a guard interval is not required between respective zones which are defined, in view of features of the FDD.

In the DL frequency band, the first control channel of the legacy system serves as the first control channel of the legacy system and the new evolution system, and the second control channel could be a dedicated control channel suitable for each system or a control channel which supports both the legacy system and the new evolution system as suggested in the present invention.

Figure 14A:
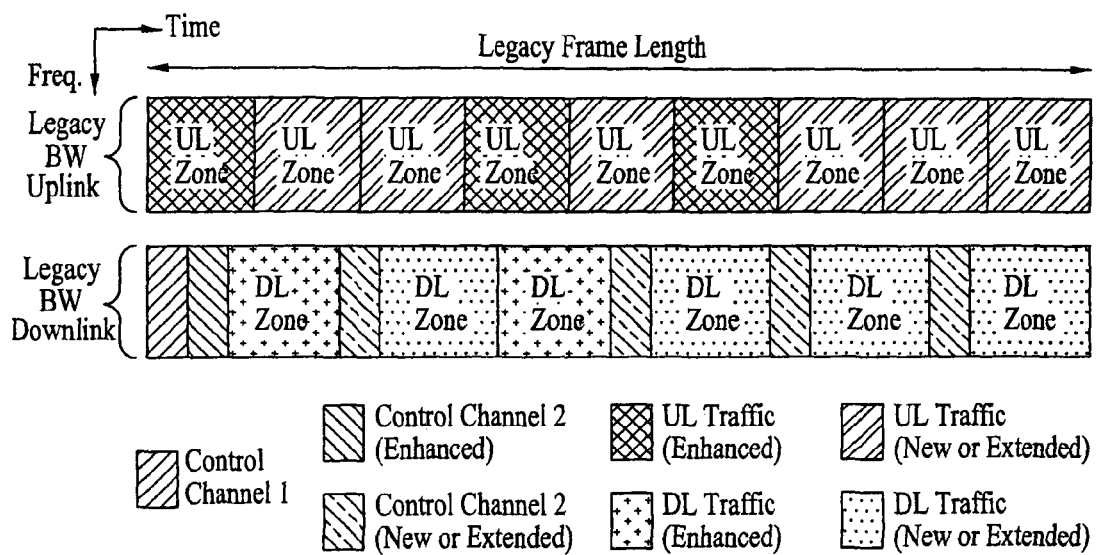
FIG. 14A illustrates an example of applying a new frame structure to a legacy frame structure while legacy FA restriction requirements are maintained in case of a FDD scheme.
Figure 14B:
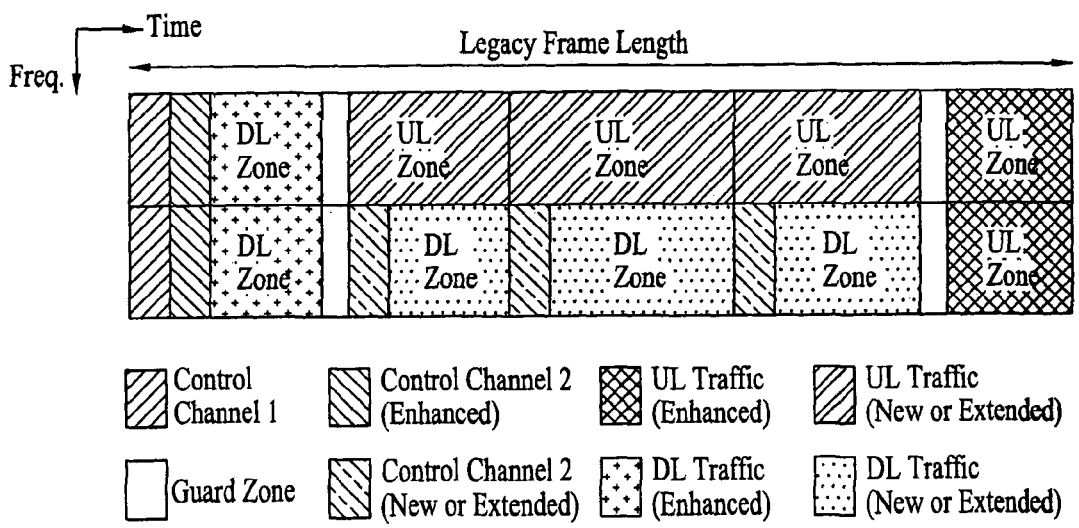
FIG. 14B illustrates an example of applying a new frame structure to a legacy frame structure while legacy FA restriction requirements are maintained when a TDD scheme and a FDD scheme coexist.

FIG. 14A and FIG. 14B illustrate embodiments in which the frame structure suggested in the present invention in accordance with the FDD scheme is reflected.

FIG. 14A illustrates an embodiment that the legacy system mode and the new evolution system mode are simultaneously applied to an uplink band and a downlink band on the legacy system mode in the FDD scheme. It will be apparent to those skilled in the art that the FDD scheme is operated in the same manner as the aforementioned TDD scheme. Although not illustrated in FIG. 14A, the first control channel (new or extended) may be arranged in the downlink of the legacy system mode in a type of midamble or postamble in the same manner as the TDD scheme illustrated in FIG. 11.

FIG. 14B illustrates a combined example of the TDD scheme and the FDD scheme. In FIG. 14B, two up and down bands are basically operated in accordance with the TDD scheme and at the same time operated internally in accordance with the FDD scheme. In this embodiment, the first control channel (new or extended) may be arranged in a type of midamble or postamble if necessary.

Figure 15:
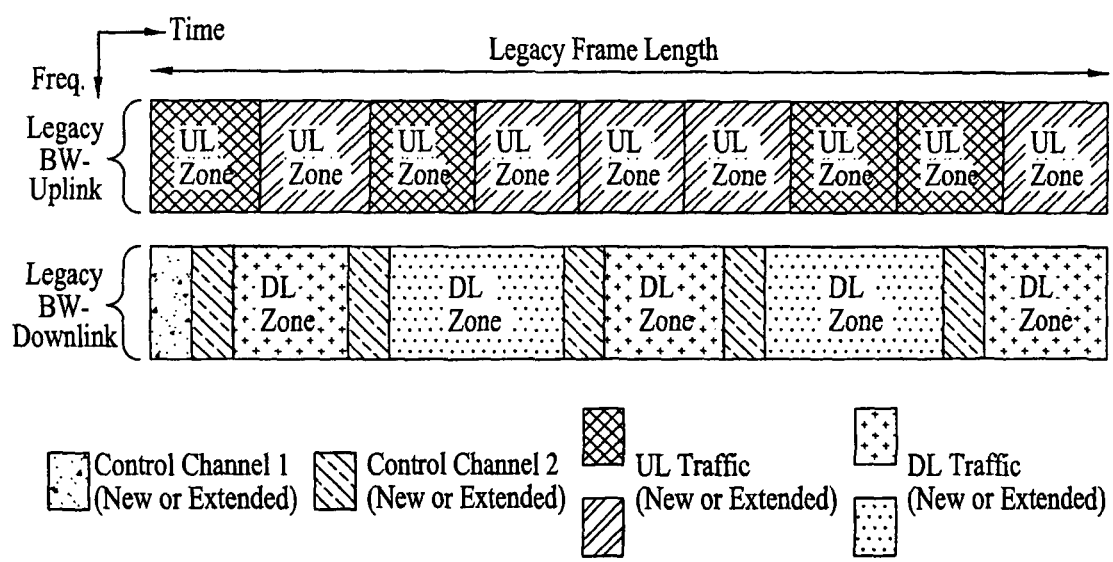
FIG. 15 illustrates an example which supports a frame structure of a new system only while legacy FA restriction requirements are maintained in case of a FDD scheme.

FIG. 15 illustrates an embodiment in which the frame structure suggested in the present invention in accordance with the FDD scheme is reflected.

FIG. 15 illustrates an embodiment that the new evolution system mode is only operated on the legacy system mode of the FDD scheme.

The current frame structure is advantageous in that response speed of the system can be improved by supporting a short frame, and overhead restriction of the new system due to support of the legacy system can be minimized. In other words, it is possible to minimize overhead of the legacy system by controlling support of the legacy system, and to support faster response speed, higher mobility, and cell environment of more various sizes by using an optimized frame structure suitable for new requirements.

It will be apparent to those skilled in the art that the aforementioned schemes which maintain FA restriction requirements of the legacy system and perform modification of FA unit can be used by combination to support the mobile station which uses the legacy system, and this combination belongs to the scope of the present invention. In other words, the frame structure is used for every FA so as not to affect the system access mode of the legacy mobile station, and at the same time the frame structure of the legacy system is used for at least one band to be used by the legacy mobile station and is induced so that all the mobile stations receive the legacy service through this band only. The new service can be supported through the new system mode for additional FA or the legacy system mode.

Figure 1:
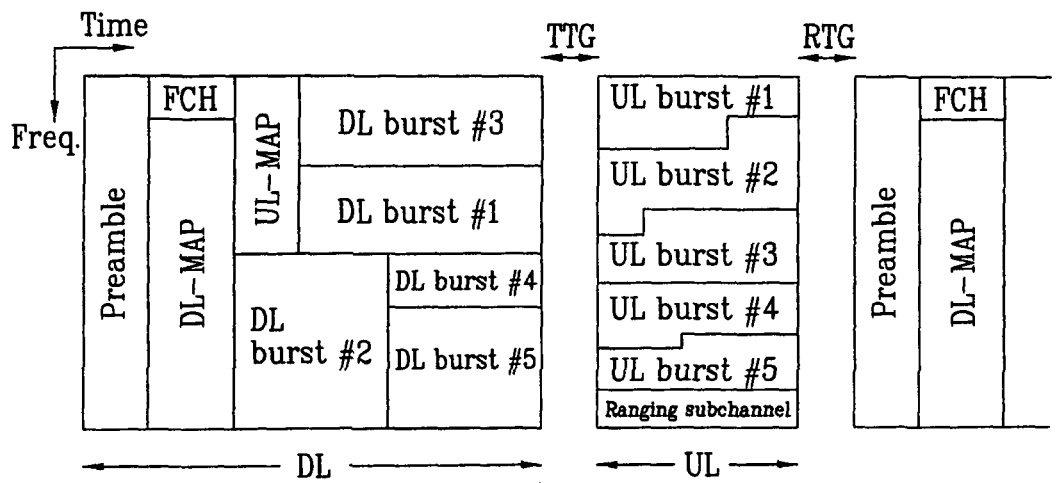
FIG. 1 illustrates a logical frame structure of IEEE 802.16e system.
Figure 2:
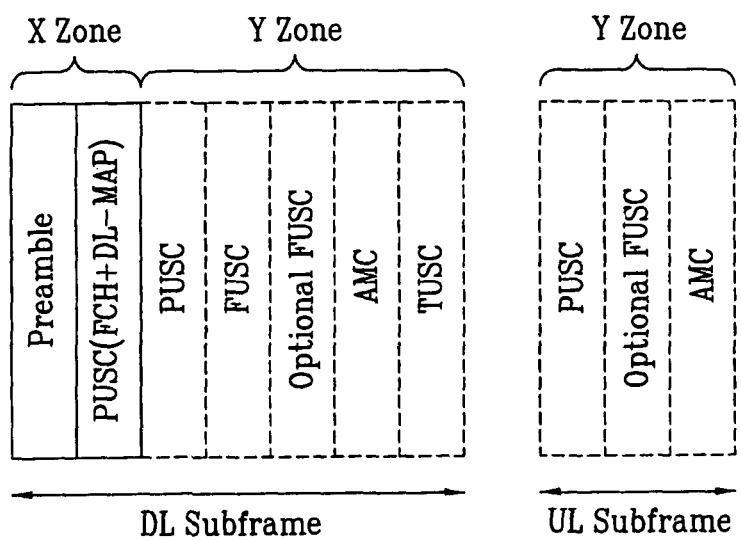
FIG. 2 illustrates a frame structure which includes multiple permutation zones in accordance with a subchannel allocation mode of IEEE 802.16e system.
Figure 3A:
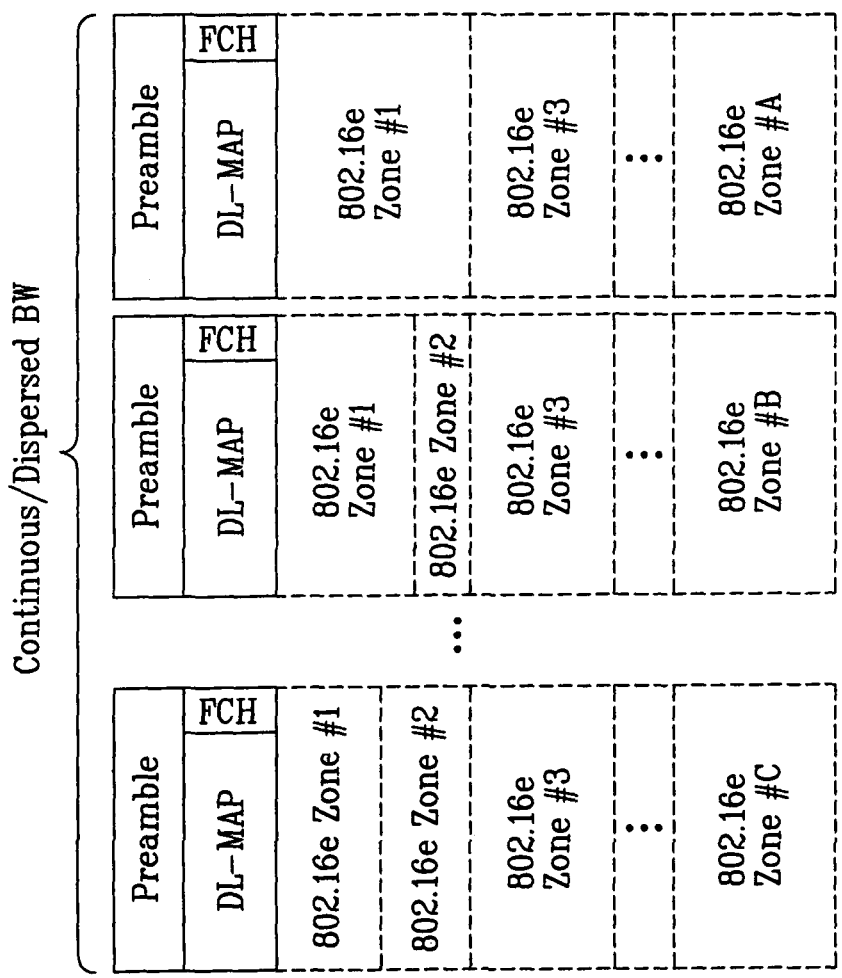
FIG. 3A illustrates a single mode frame structure of IEEE 802.16e system within a random continuous or dispersed band.
Figure 3B:
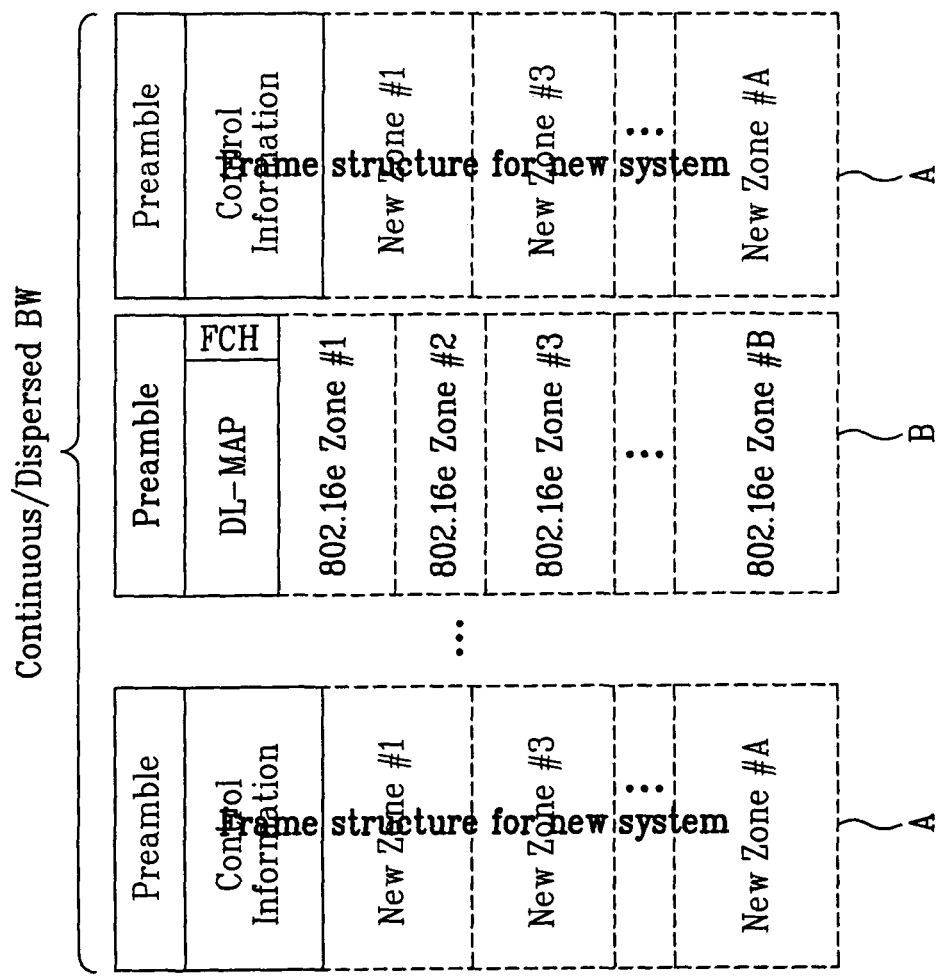
FIG. 3B illustrates a dual mode frame structure of IEEE 802.16e system within a random continuous or dispersed band.

To achieve the object of the present invention, the system should be designed to maximize scalability, thereby supporting a flexible and united resource structure within a continuous or dispersed band suggested in the present invention separately from design of the new frame structure. To this end, it is possible to apply an effective system to the dispersed band by increasing scalability of the resource structure suggested in the continuous band as illustrated in FIG. 1. Considering that the legacy IEEE 802.16e system has been designed to support bandwidths of 1.25, 2.5, 5, 10, 20 MHz, the frame structure of the new evolution system mode can be designed to support 32 bandwidths of maximum 40 MHz, and allocation of various bandwidths of the legacy mode and the new mode may be considered within a separate band. For example, a continuous band of 5 MHz can support five types of bandwidths such as (0 MHz, 5 MHz), (1.25 MHz, 3.75 MHz), (2.5 MHz, 2.5 MHz), (3.75 MHz, 1.25 MHz), (5 MHz, 0 MHz). In this case, (x MHz, y MHz) means a bandwidth which is considered by the legacy IEEE 802.16e mode and the new mode.

According to the present invention, through the data communication method which can simultaneously support the legacy multiple carrier multiple access system and the new evolution multiple carrier multiple access system for a random bandwidth which is allocated, the following advantages can be obtained to increase efficiency of radio resources.

First, heterogeneous modes of the legacy multiple carrier broadband wireless communication mode and the new multiple carrier broadband wireless communication mode can be used together in the multiple carrier broadband wireless communication system.

Second, it is possible to enable flexible channel allocation for the environment of various bandwidths in the multiple carrier broadband wireless communication system.

Third, it is possible to apply the mobile station on the legacy multiple carrier broadband wireless communication system to the new multiple carrier broadband wireless communication system without performance degradation of the mobile station in the multiple carrier broadband wireless communication system.

Fourth, it is possible to support various dual modes in accordance with the receiving bandwidth capacity of the mobile station in the multiple carrier broadband wireless communication system.

Finally, it is possible to use the legacy control channel in the multiple carrier broadband wireless communication system during design of the new multiple carrier broadband wireless communication system.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A data communication method of a base station (BS) according to a dual mode of a first system mode and a second system mode in a wireless communication system which uses multiple carriers, the method comprising:

transmitting a mode indicator through a first resource zone of a frame, the mode indicator indicating that the wireless communication system supports the dual mode, transmitting, by the BS to at least one mobile station only supporting the first system mode and at least one mobile station supporting both the first system mode and the second system mode, information through the first resource zone of the frame and a second resource zone of the frame, the first and second resource zones being contiguous, wherein the first resource zone is used to transmit, by the BS, data only for the first system mode and control information for the first system mode and the second system mode, wherein the second resource zone is used to transmit, by the BS, data only for the second system mode, the data only for the second system mode being other than control information for the second system mode, wherein the control information for the first system mode and the second system mode includes a preamble, a frame control header and at least one of uplink resource map information and downlink channel resource map information for the at least one mobile station only supporting the first system mode and the at least one mobile station supporting both the first system mode and the second system mode.

2. The data communication method of claim 1, further comprising:

receiving first uplink data from the at least one mobile station which only supports the first system mode, through the first resource zone; and receiving second uplink data from the at least one mobile station which supports both the first system mode and the second system mode, through the second resource zone.

3. The data communication method of claim 1, further comprising:

transmitting another mode indicator through the first resource zone in a specific frame, the another mode indicator indicating that the specific frame supports a single mode; and performing communication with the at least one mobile station supporting both the first system mode and the second system mode in the first resource zone and the second resource zone of the specific frame in accordance with the second system mode.

4. A data communication method of a mobile station which supports a dual mode of a first system mode and a second system mode in a wireless communication system which uses multiple carriers, the data communication method comprising:

receiving a mode indicator through a first resource zone of a frame, the mode indicator indicating that the wireless communication system supports the dual mode, receiving, by the mobile station from a BS, information through the first resource zone of the frame and a second resource zone of the frame, the first and second resource zones being contiguous, wherein the first resource zone is used to receive, by the MS, data only for a first system mode and control information for the first system mode and the second system mode, wherein the second resource zone is used to receive, by the MS, data only for the second system mode, the data only for the second system mode being other than control information for the second system mode, and wherein the control information for the first system mode and the second system mode includes a preamble, a frame control header and at least one of uplink resource map information and downlink channel resource map information for the at least one mobile station only supporting the first system mode and the at least one mobile station supporting both the first system mode and the second system mode.

5. The data communication method of claim 4, further comprising one of:

transmitting first uplink data through the first resource zone; and transmitting second uplink data through the second resource zone.

6. A data communication method of a base station (BS) according to a dual mode of a first system mode and a second system mode in a wireless communication system which uses multiple carriers, the method comprising:

transmitting a mode indicator through a first resource zone of a frame, the mode indicator indicating that the wireless communication system supports the dual mode, transmitting, by the BS to at least one mobile station only supporting the first system mode and at least one mobile station supporting both the first system mode and the second system mode, information through the first resource zone of the frame and a second resource zone of the frame, the first and second resource zones being contiguous, wherein the first resource zone is used to transmit, by the BS, data for the at least one mobile station only supporting the first system mode and control information for the first system mode and the second system mode, wherein the second resource zone is used to transmit, by the BS, data for the at least one mobile station supporting both the first system mode and the second system mode, wherein the control information for the first system mode and the second system mode includes a preamble, a frame control header and at least one of uplink resource map information and downlink channel resource map information for the at least one mobile station only supporting the first system mode.

7. A data communication method of a mobile station (MS) which supports a dual mode of a first system mode and a second system mode in a wireless communication system which uses multiple carriers, the data communication method comprising:

receiving a mode indicator through a first resource zone of a frame, the mode indicator indicating that the wireless communication system supports the dual mode, receiving, by the mobile station from a base station, information through the first resource zone of the frame and a second resource zone of the frame, the first and second resource zones being contiguous, wherein the first resource zone is used to receive, by the MS, data for the at least one mobile station only supporting the first system mode and control information for the first system mode and the second system mode, wherein the second resource zone is used to receive, by the MS, data for the at least one mobile station supporting both the first system mode and the second system mode, and wherein the control information for the first system mode and the second system mode includes a preamble, a frame control header and at least one of uplink resource map information and downlink channel resource map information for the at least one mobile station only supporting the first system mode.

* * * * *